(12) United States Patent
Karube et al.

(10) Patent No.: US 7,231,996 B2
(45) Date of Patent: Jun. 19, 2007

(54) FRONT END COMPONENTS FOR A SADDLE-TYPE VEHICLE

(75) Inventors: Shinichi Karube, Saitama (JP); Kinoko Kaita, Saitama (JP); Nobuhiko Nakano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 334 days.

(21) Appl. No.: 10/759,380

(22) Filed: Jan. 16, 2004

(65) Prior Publication Data
US 2004/0188156 A1 Sep. 30, 2004

(30) Foreign Application Priority Data

Feb. 17, 2003 (JP) .............................. 2003-038800
Feb. 17, 2003 (JP) .............................. 2003-038801
Feb. 17, 2003 (JP) .............................. 2003-038802

(51) Int. Cl.
*B62D 25/08* (2006.01)
(52) U.S. Cl. ................................................ 180/69.24
(58) Field of Classification Search ................ 180/218, 180/225, 69.24, 68.4, 68.6; 296/193.09, 296/193.1, 193.11, 198
See application file for complete search history.

(56) References Cited

U.S. PATENT DOCUMENTS 4,667,758 A * 5/1987 Tamura ....................... 180/68.4
5,620,217 A * 4/1997 Ichikawa et al. ............. 293/102
6,523,634 B1 * 2/2003 Gagnon et al. ............... 180/291
6,547,027 B1 * 4/2003 Kalhok et al. ............... 180/312
6,622,666 B2 * 9/2003 Kuji ............................ 123/41.1
6,820,708 B2 * 11/2004 Nakamura ................... 180/68.2

FOREIGN PATENT DOCUMENTS

| JP | 01218987 A | 9/1989 |
| JP | 03-109185 | 5/1991 |
| JP | B-7-16551 | 4/1995 |
| JP | 8-295262 | * 12/1996 |
| JP | 2000-153780 | * 6/2000 |

* cited by examiner

*Primary Examiner*—Frank Vanaman
(74) *Attorney, Agent, or Firm*—Carrier, Blackman & Associates, P.C.; Joseph P. Carrier; William D. Blackman

(57) ABSTRACT

A front cover structure for a saddle-type vehicle, in which the cost of replacement in damage and the manufacturing cost can be reduced and a degree of the freedom of design appearance can be enhanced. In the front cover structure for a saddle-type vehicle in which a front cover 27 is provided so that it encloses a headlight 20 in the center of the front of the body, the front cover 27 is divided into a center cover for placement covering a top central front portion of the vehicle body, a left shroud 85L provided for placement on the left side of the center cover, and a right shroud 85R provided for placement on the right side of the center cover. The left shroud 85L and the right shroud 85R are coupled via the headlight 20.

8 Claims, 11 Drawing Sheets

FRONT END COMPONENTS FOR A SADDLE-TYPE VEHICLE

CROSS-REFERENCE TO RELATED APPLICATIONS

The present application claims priority under 35 USC 119 based on Japanese patent applications No. 2003-038800, 2003-038801, and 2003-038802, all filed Feb. 17, 2003.

BACKGROUND OF THE INVENTION

1. Field of the Invention

The present invention relates to front end components for a saddle-type vehicle, especially for an all-terrain vehicle. More particularly, the present invention relates to a segmented front cover structure, and to a radiator-support structure for a saddle-type vehicle.

2. Description of the Background Art

A known front cover structure, for a saddle-type vehicle, is formed by integrally molding a center cover and a pair of left and right shrouds for placement on the front of the vehicle body, and for attaching to a body frame (for example, refer to Japanese published patent document JP-A-3-109185).

The structure disclosed in JP-A-3-109185 has a problem, that as a front cover formed by integrally molding a center cover and a pair of right and left shrouds in a single unit, if any part of the front cover is damaged, the whole front cover must be removed and replaced, including the center cover and the right and left shrouds. As a result, the cost of repair is increased.

Further, the known structure also has a problem that since the whole front cover is integrally molded as a single piece, a large metal mold and a large molding machine are required, and this means that the manufacturing cost is increased. Further, the known structure also has a problem that since the whole front cover is integrally molded, a degree of the freedom of design appearance is often limited by manufacturing considerations.

Although the known devices have some utility for their intended purposes, there is still a need to provide an improved front cover structure for a saddle-type vehicle which is able to be formed in segments, so that only a damaged portion needs to be removed for repair. In particular, there is a need for an improved front cover structure for a saddle-type vehicle including components designed to solve the above-mentioned problems.

SUMMARY OF THE INVENTION

Therefore, an object of the invention is to provide the front cover structure for a saddle-type vehicle in which the cost of replacement in damage and the manufacturing cost can be reduced, and a degree of the freedom of design appearance can be enhanced.

As described in detail herein, according a first aspect of the present invention, as the front cover is divided into three separate parts including a center, a left shroud and a right shroud, only the damaged part out of the center cover, the left shroud and the right shroud has to be replaced and the cost of repairing damage can be reduced. Similarly, as the size of the metal mold and the molding machine required in manufacture can be reduced, the manufacturing cost can be reduced. Further, as the limit related to the freedom of design appearance is reduced, a degree of the freedom of the design appearance can be enhanced. In addition, as each molded part is relatively small, molding shrinkage and other manufacturing problems are reduced and as a result, the precision of molding can be improved.

In addition, as the left shroud and the right shroud are coupled via the headlight to be capable of being combined into a small assembly, even if the front cover is divided into the center cover, the left shroud and the right shroud, the small assembly can be pre-assembled and attached as a unit to a body frame, in a main assembly line. Therefore, the extension of time required for assembly per one vehicle can be inhibited. Additionally, when the left shroud and the right shroud are coupled via the headlight into the small assembly, any dimensional error of each part can be adjusted, so that the dimensional error is absorbed in a portion in which each part is attached. Therefore, as the precision as the small assembly can be enhanced, it can be smoothly mounted on the body frame.

According to the invention disclosed in a second aspect hereof, as the separate left fender is attached to the left shroud and the separate right fender is attached to the right shroud, the damaged part out of the center cover, the left shroud, the right shroud, the left fender and the right fender has only to be replaced and the cost of replacement in damage can be further reduced. Similarly, as the metal mold and the molding machine required in manufacture can be further reduced, the manufacturing cost can be further reduced. Further, as the limit related to flexibility of design appearance is further removed, a degree of the freedom of the design appearance can be further enhanced. Also, as each molded part is further reduced in size, molding shrinkage and other manufacturing problems are further reduced and as a result, the precision of molding can be further improved.

According to the invention disclosed in a third aspect hereof, even if the front cover is divided into the center cover, the left shroud and the right shroud, the left shroud and the right shroud are coupled via the headlight into the small assembly in subassembly, and the pre-assembled small assembly can be mounted, as a unit, on the body frame in a main assembly line. Therefore, the extension of time required for assembly per one vehicle can be inhibited. Additionally, when the left shroud and the right shroud are coupled via the headlight into the small assembly, the dimensional error of each part can be adjusted so that the dimensional error can be absorbed in a portion in which each part is attached. Therefore, as the precision as the small assembly can be enhanced, the small assembly can be smoothly mounted on the body frame.

According to the invention disclosed in a fourth aspect hereof, even if the front cover is divided into the center cover, the left shroud, the right shroud, the left fender and the right fender, the left fender is attached to the left shroud, the right fender is attached to the right shroud and the left shroud and the right shroud are coupled via the headlight into the small assembly in subassembly, and in a main assembly line, the small assembly can be mounted on the body frame. Therefore, the extension of time required for assembly per one vehicle can be further inhibited. Additionally, when the left fender is attached to the left shroud, the right fender is attached to the right shroud and the left shroud and the right shroud are coupled via the headlight into the small assembly in subassembly, the dimensional error of each part can be adjusted, so that the dimensional error can be absorbed in a portion in which each part is attached. Therefore, as the precision as the small assembly can be further enhanced, the small assembly can be further smoothly mounted on the body frame.

According to the invention disclosed in a fifth aspect hereof, as the left shroud and the right shroud are attached to each stay for attaching the headlight to the body frame, the stay can be shared. Therefore, the number of parts can be reduced.

According to the invention disclosed in a sixth aspect hereof, as the center cover is provided so that it can be detached without a tool, it can be detached and attached without a tool in maintenance and other applications. Therefore, the workability and convenience of maintenance and other applications can be enhanced.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

Figure 1:
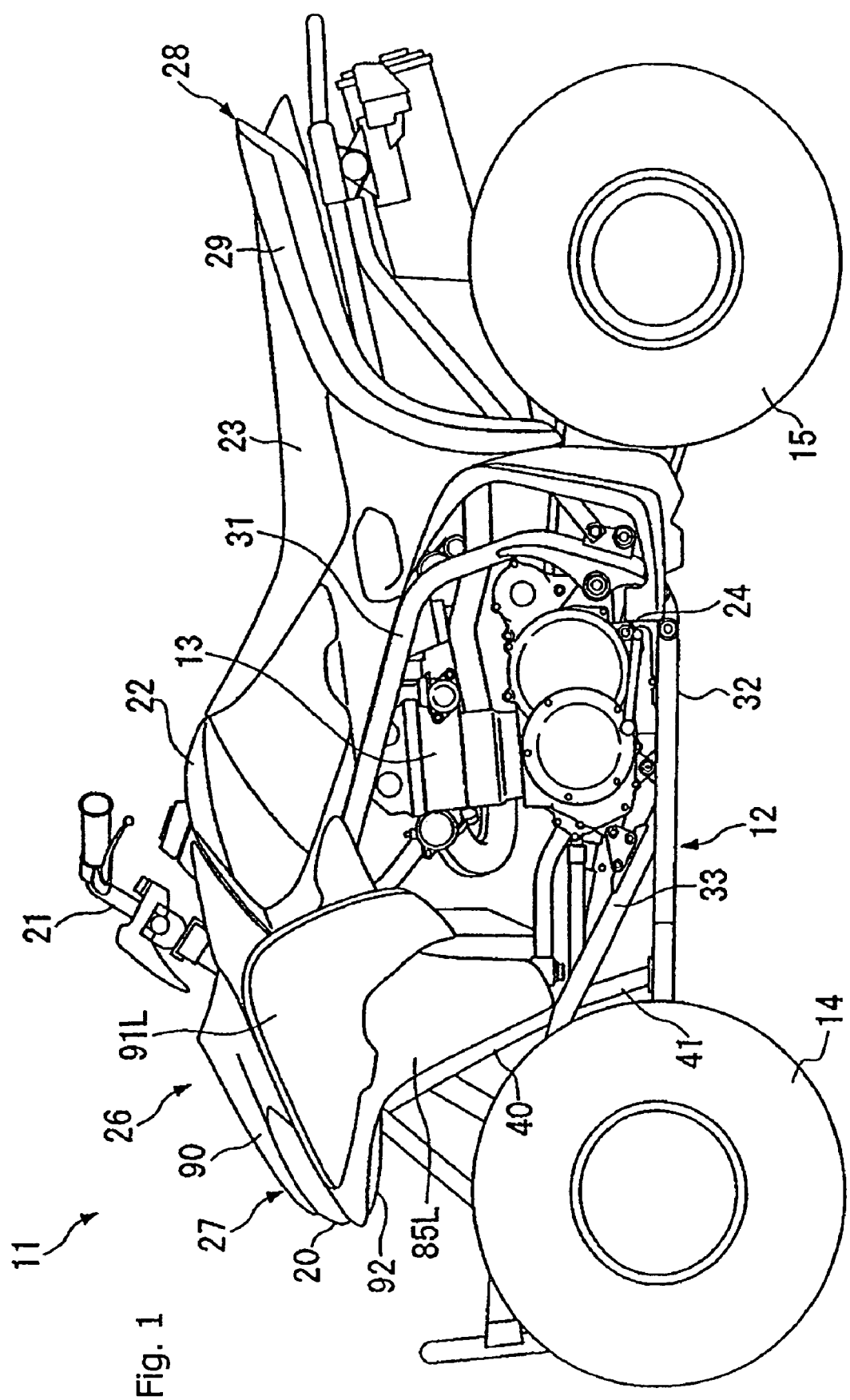
FIG. 1 is a side elevational view showing a saddle-type all-terrain vehicle, to which one embodiment of the invention is applied.

Referring to the drawings, a selected embodiment of the invention will be described below. It should be understood that the following descriptive embodiment is intended to illustrate, rather than to limit the invention. The front, the rear, the left and the right in the following description are those as considered by a driver of the vehicle, seated on the vehicle seat, and facing in a direction of forward travel thereof.

To achieve the object described above, in a first aspect of the illustrated embodiment of the invention, a front cover structure for a saddle type vehicle 11 is provided, in which the front cover 27 surrounds and encloses a headlight (for example, a headlight 20 in the embodiment) in the center of the front of the body. In the first aspect hereof, the front cover is divided into three separate pieces, namely, a center cover (for example, a front center cover 90 in the embodiment provided for placement over the front central portion of the body frame, a left shroud (for example, a left shroud 85L in the embodiment) provided for placement on the left side of the body frame adjacent the center cover, and a right shroud (for example, a right shroud 85R in the embodiment) provided for placement on the right side of the body frame adjacent the center cover. In the depicted embodiment, the left shroud 85L and the right shroud 85R are coupled via the headlight.

As described above, as the front cover is divided into the center cover, the left shroud and the right shroud portions. With this structure, if part of the front cover 90 becomes damaged, only the damaged part out of the center cover, the left shroud and the right shroud has to be replaced, with the remaining parts being re-used. When the described sectional front cover is used, the size of a metal mold and a molding machine required in manufacture can be reduced. Further, when the described three-section front cover is used, the limit related to manufacture of design appearance is mostly removed. In addition, as each molded part is reduced in size, molding shrinkage and other manufacturing problems are reduced.

In addition, as the left shroud and the right shroud are coupled via the headlight, the left shroud and the right shroud make up a small assembly, even if the front cover is divided into the center cover, the left shroud and the right shroud, and this small assembly can be pre-assembled and attached to a body frame in a main assembly line. Additionally, when the left shroud and the right shroud are coupled via the headlight into the small assembly, the dimensional error of each part can be adjusted so that the dimensional error is absorbed in a portion in which each part is attached.

The invention disclosed in the second aspect hereof is based upon the invention disclosed in the first aspect, and is characterized in that a separate left fender (for example, a left fender 91L in the embodiment) is attached to the left shroud and a separate right fender (for example, a right fender 91R in the embodiment) is attached to the right shroud.

As described above, as the separate left fender is attached to the left shroud and the separate right fender is attached to the right shroud, when a portion of the front cover assembly is damaged, only the damaged part out of the center cover, the left shroud, the right shroud, the left fender and the right fender has to be replaced. Additionally, with the described arrangement, the metal mold and the molding machine required in manufacture can be further reduced in size. Further, with the described arrangement, the limit related to manufacture of design appearance is further reduced. In addition, with the described arrangement, as each molded part is further reduced in size, molding shrinkage and other manufacturing problems are further reduced.

The invention disclosed in a third aspect hereof is based upon the invention disclosed in the first and second aspects, and is characterized in that the left shroud and the right shroud are coupled via the headlight to be a small assembly (for example, a front fender set 121 in the embodiment of FIG. 7), and can be attached to a body frame (for example, a body frame 12 in the embodiment) in a state of the small assembly.

Hereby, even if a front cover is divided into a center cover, the left shroud and the right shroud, the left shroud and the right shroud are coupled via the headlight in the subassembly into the small assembly and the small assembly can be attached to the body frame in a main assembly line. Additionally, when the left shroud and the right shroud are coupled via the headlight into the small assembly, the dimensional part of each part can be adjusted, so that the dimensional error is absorbed in a portion in which each part is attached.

The invention disclosed in a fourth aspect hereof is based upon the invention disclosed in the second aspect, and is characterized in that the left shroud and the right shroud are coupled via the headlight to be a small assembly in a state in which the left fender is attached to the left shroud, and the right fender is attached to the right shroud, and they can be attached to a body frame as part of the small assembly.

Hereby, even if a front cover is divided into a center cover, the left shroud, the right shroud, the left fender and the right fender, the left fender is attached to the left shroud in subassembly, the right fender is attached to the right shroud, the left shroud and the right shroud are coupled via the headlight into the small assembly, and the small assembly can be attached, as a unit, to the body frame in a main assembly line. Additionally, when the left fender is attached to the left shroud, the right fender is attached to the right shroud respectively in the subassembly and the left shroud and the right shroud are coupled via the headlight into the small assembly, the dimensional error of each part can be adjusted, so that any dimensional error is absorbed in a portion in which each part is attached.

The invention disclosed in a fifth aspect hereof is based upon the invention disclosed in any of the first four aspects, and is characterized in that a pair of stays (for example, headlight stays 103 in the embodiment) are extended backward from both right and left sides of the headlight. These stays are attached to a body frame (for example, a body frame 12 in the embodiment), and the left shroud and the right shroud are attached to these stays.

Hereby, as the left shroud and the right shroud are attached to each stay for attaching the headlight to the body frame, the stay can be shared. Therefore, the number of parts can be reduced.

The invention disclosed in a sixth aspect hereof is based upon the invention disclosed in any of the first five aspects, and is characterized in that the center cover is provided so that it can be detached without a tool.

As described above, as the center cover is provided so that it can be detached without a tool, it can be detached and attached without a tool in maintenance and other applications. Therefore, the workability of maintenance and other applications can be enhanced.

FIG. 1 is a side view showing a saddle-type vehicle, to which an illustrative embodiment of the invention is applied.

This saddle-type vehicle 11 is a so-called buggy or all-terrain vehicle, which is mainly a vehicle for running either off-road or on an uneven road. The saddle-type vehicle 11 is provided with a body frame 12 forming its skeleton, and mainly composed of tubular pipes. The vehicle 11 also includes an engine 13 mounted substantially in the longitudinal center of the body frame 12, and a front wheel 14 suspended so as to be vertically rockable on the body frame 12. The front wheel 14 is supported to be steerable in left and right lateral directions. Front wheels 14 are arranged on both the left side and the right side of the front of the body frame 12. A rear wheel 15 is also supported by the body frame 12 and is suspended so as to be vertically rockable on the body frame 12. Rear wheels are also arranged on both the left rear side and the right rear side of the body.

The saddle-type vehicle 11 is also provided with a headlight 20, arranged in the center of the front section of the body frame 12. A handlebar 21 is also provided above the front of the body, with the handlebar extended laterally for steering the front wheels 14.

The vehicle 11 also includes a fuel tank 22, provided above the longitudinal center of the frame, a seat 23 provided behind the fuel tank 22, and a respective step 24, provided on the frame at each of the left and right sides of the engine 13.

A body cover 26, forming the outer surface of the saddle-type vehicle 11, is provided with a front cover 27, arranged to cover the upper front part of the body, also covering the periphery of the headlight 20, in the front central portion of the body.

The body cover 26 also includes a rear cover 28, integrated with the seat 23, and arranged to cover the upper rear part of the body. The rear cover 28 includes a rear fender 29 that covers the rear wheel 15.

Figure 2:
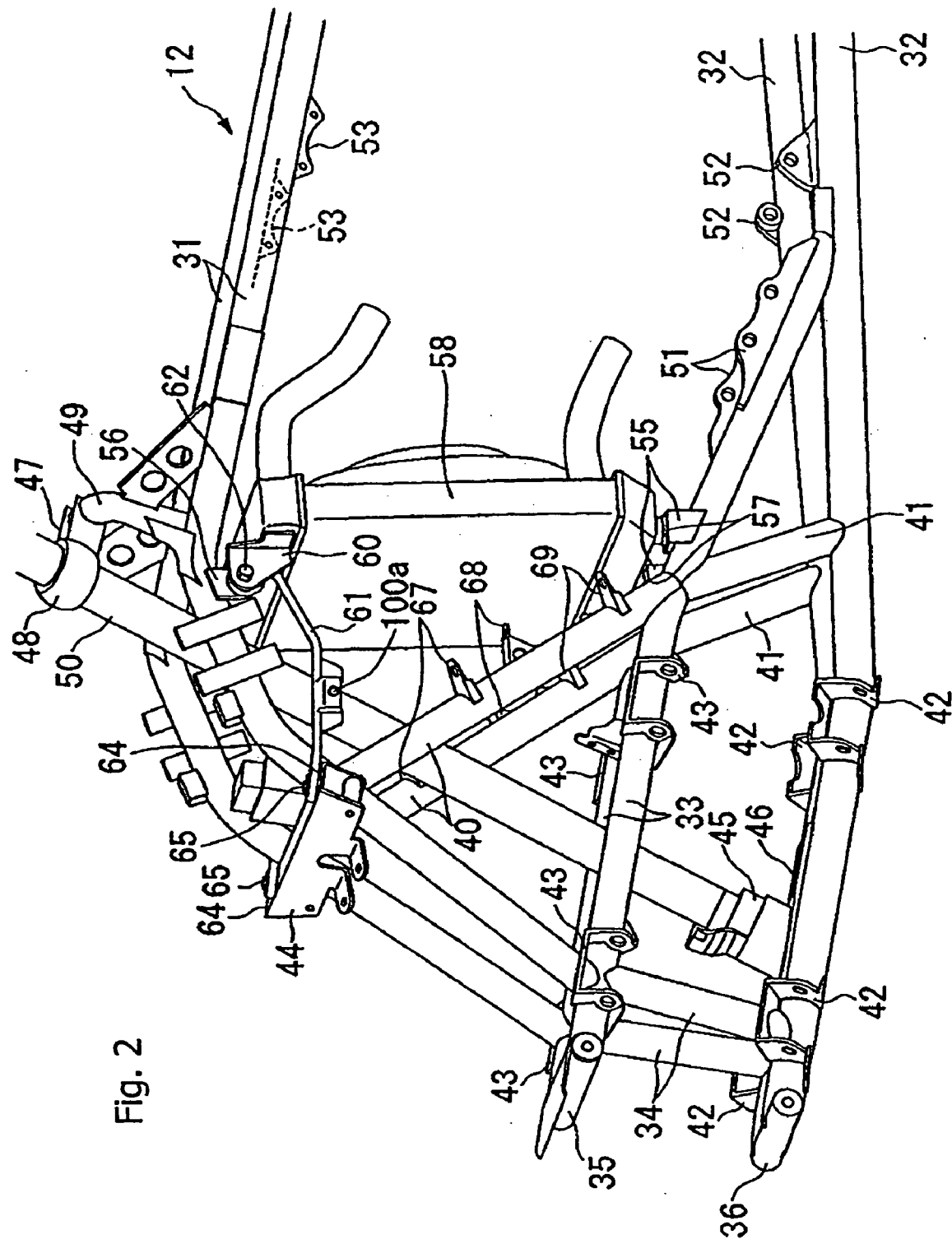
FIG. 2 is a perspective view showing the front of a body frame component of the vehicle of FIG. 1, to which one embodiment of the invention is applied.

Further details of the body frame 12 are shown in FIG. 2. The front ends of a pair of right and left upper pipes 31 extend longitudinally along the top of the body frame 12. The front ends of the right and left upper pipes 31 are inclined downwardly, and are coupled to the front ends of a pair of right and left intermediate front pipes 33, extended forward and diagonally upward. The lower ends of the intermediate front pipes are connected to a pair of right and left main foundation pipes 32, which make up the bottom part of the body frame 12.

A pair of right and left vertical front pipes 34 are coupled to the lower sides of the intermediate front pipes 33, so that the vertical front arm pipes are arranged on lines extended from the upper pipes 31, and the lower ends of these vertical front pipes 34 are coupled to the front ends of both main foundation pipes 32.

Further, the front ends of both front intermediate pipes 33 are coupled to a horizontal front cross pipe 35 along the lateral direction thereof. In addition, the front ends of the right and left main foundation pipes 32 are coupled to another horizontal front cross pipe 36, along the lateral direction thereof.

A pair of right and left brace pipes 40 are coupled to the body frame 12 in front predetermined positions of the right and left upper pipes 31, above the front intermediate pipes 33, so that the brace pipes extend down and diagonally backward from the upper pipes 31. The lower ends of these brace pipes 40 are welded to intermediate sections of the right and left front intermediate pipes 33. Further, a pair of right and left front subpipes 41 are coupled to the right and left front intermediate pipes 33, and to the right and left main foundation pipes 32, so that the front subpipes are arranged on lines extended from the brace pipes 40.

Further, in the body frame 12, front arm brackets 42, for supporting front steering and suspension components (not shown), are longitudinally fixed to the right and left main foundation pipes 32. Front upper arm brackets 43 are also provided for supporting the front suspension, and the front upper arm brackets 43 are longitudinally fixed to the right and left front intermediate pipes 33. Further, a front cushion bracket 44, also for supporting the front suspension, is also laterally fixed to the area of the body frame where the upper pipe 31 and the brace pipe 40 interconnect, as shown.

In addition, in the body frame 12, a front lower cross plate 46, for supporting a steering column support socket 45, is installed extending across both main foundation pipes 32. Also, a pair of short steering column support pipes 49, for supporting a steering collar 48 via steering holder brackets 47, are affixed to both upper pipes 31, as shown. A steering shaft 50, coupled to the handlebar 21, is rotatably supported by the steering column support socket 45, and by the steering collar 48, so that the steering shaft can be freely turned by a driver.

Further in the body frame 12, front engine mounting brackets 51 are fixed to the rear end sides of both front intermediate pipes 33, and lower engine mounting brackets 52 are fixed to the slightly rear sides of positions in which each main foundation pipe 32 and each front intermediate pipe 33 are coupled. Furthermore, upper engine mounting brackets 53 are fixed to positions on both upper pipes 31 over the lower engine mounting brackets 52.

In the body frame 12, the engine 13, shown in FIG. 1, is mounted to the front engine mounting brackets 51, the lower engine mounting brackets 52, and the upper engine mounting brackets 53, using appropriate mounting hardware.

Further, in the body frame 12, pedestal-shaped lower radiator stays 55 are fixed to the front intermediate pipes 33, slightly behind the connections between each front intermediate pipe 33 and each brace pipe 40, and upper radiator stays 56 (only the left one is shown in FIG. 2) are fixed to the upper pipes 31, near the steering shaft 50. A fitting shank (not shown) on both right and left sides of a lower part of the body of a radiator 58, which is a heat exchanger, is inserted in each of circular elastic grommets 57 attached to lower both radiator stays 55, and right and left mounting brackets 60 (only the left one is shown in FIG. 2) in an upper part of the radiator body 58 and the rear ends of a pair of right and left stays 61 (only the left one is shown in FIG. 2) are jointly fastened to upper both radiator stays 56 by a bolt 62. The mounting bracket 60 and the stay 61 are held between the bolt 62 and the radiator stay 56 by screwing the bolt into a tapped hole (not shown) of the radiator stay 56, after the bolt 62 is inserted into an installation hole (not shown) of the mounting part 60 of the radiator body 58 from the outside of the body, and is inserted into the installation hole (not shown) at the rear end of the stay 61. As described above, the radiator body 58 is supported by both upper pipes 31 and both front intermediate pipes 33, respectively, of the body frame 12.

The respective front ends of the above-mentioned stays 61 are attached, by bolts 65, to mounting parts 64 on the outside of the body of the front cushion bracket 44. That is, as the bolt 65 is inserted into an installation hole (not shown) at the front end of the stay 61 from above, and is screwed into a tapped hole (not shown) of the mounting part 64 of the front cushion bracket 44, the stay 61 is held between the bolt 65 and the front cushion bracket 44.

The upper and lower radiator stays 56, 55 are arranged on the front side of the engine mounting front bracket 51, the engine mounting lower bracket 52 and the engine upper bracket 53 and support the radiator body 58 on the body frame 12 in front of the engine 13.

In addition, an oil cooler stay 67, an oil cooler lower stay 68 and a radiator grille stay 69 in order from the top are fixed to each brace pipe 40 of the body frame 12, and an oil cooler (not shown) is fixed to the oil cooler stay 67 and the oil cooler lower stay 68.

Figure 3:
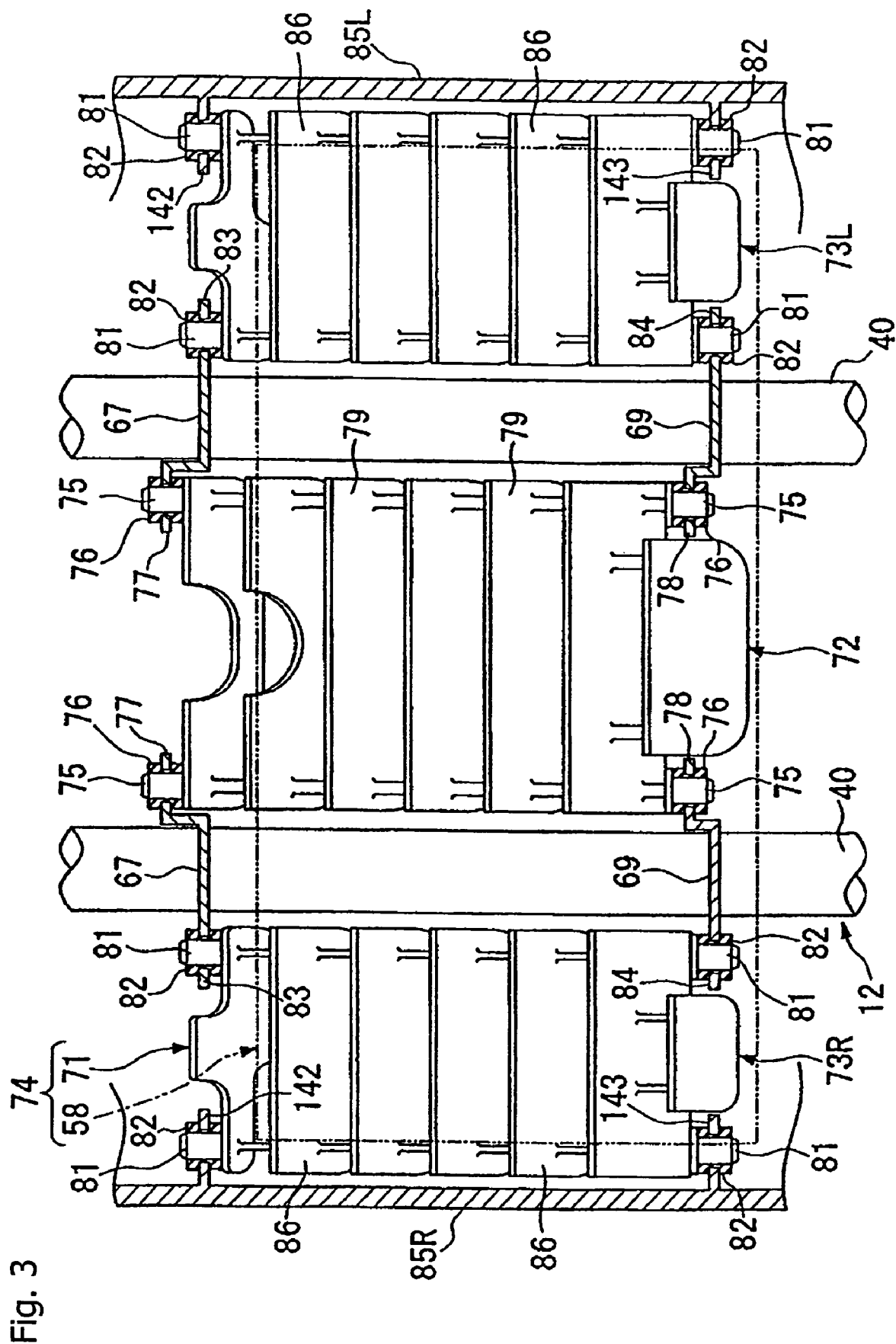
FIG. 3 is a front plan view, partially in section and partially cut away, showing a radiator grille of the vehicle to which one embodiment of the invention is applied.

Additionally, as shown in FIG. 3, a radiator grille 71 is fixed to the oil cooler stay 67 and the radiator grille stay 69, and in this state, the radiator grille 71 is positioned in front of the radiator body 58. The radiator grille 71 is divided into three main sections, a center grille 72 in the center in the lateral direction, a left grille 73L on the left side and a right grille 73R on the right side. A radiator 74 is formed by the radiator body 58 and the radiator grille 71.

Both the right and left sides of the center grille 72 are supported by both brace pipes 40 by fitting a fitting shank (support) 75 formed at upper, lower, right and left four corners into circular elastic grommets 76 attached to center grille mounting parts 77 extended inside the body of the oil cooler stays 67 fixed to both brace pipes 40 and into circular elastic grommets 76 attached to center grille mounting parts 78 extended inside the radiator body grille stays 69 fixed to both brace pipes 40, deforming the whole. The center grille 72 is made of resin easily transformed and is vertically provided with plural fins 79.

Additionally, the right side of the left grille 73L is supported by the left brace pipe 40 by fitting each fitting shank (support) 81 vertically formed on one side into a circular elastic grommet 82 attached to a side grille mounting part 83 extended outside the body of the oil cooler stay 67 fixed to the left brace pipe 40 and into a circular elastic grommet 82 attached to a side grille mounting part 84 extended outside the radiator body grille stay 69 fixed to the left brace pipe 40, deforming the whole. The left grille 73L is supported by a left shroud 85L the left side of which is a body cover member (described later).

The left side of the right grille 73R is supported by the right brace pipe 40 by fitting each fitting shank 81 vertically formed on one side into the circular elastic grommet 82 attached to the side grille mounting part 83 extended outside the body of the oil cooler stay 67 fixed to the right brace pipe 40 and into the circular elastic grommet 82 attached to the side grille mounting part 84 extended outside the radiator body grille stay 69 fixed to the right brace pipe 40, deforming the whole. The right grille 73R is supported by a right shroud 85R the right side of which is a body cover member (described later). The left grille 73L and the right grille 73R are also vertically provided with plural fins 86 made of resin easily transformed.

The center grille 72, the left grille 73L and the right grille 73R respectively divided in three guide striking wind into the radiator body 58, preventing a small stone and others from colliding. As the brace pipe 40 exists between the center grille 72 and the left grille 73L and between the center grille 72 and the right grille 73R, a small stone and others are naturally prevented from moving on the side of the radiator body 58 via between them.

Figure 4:
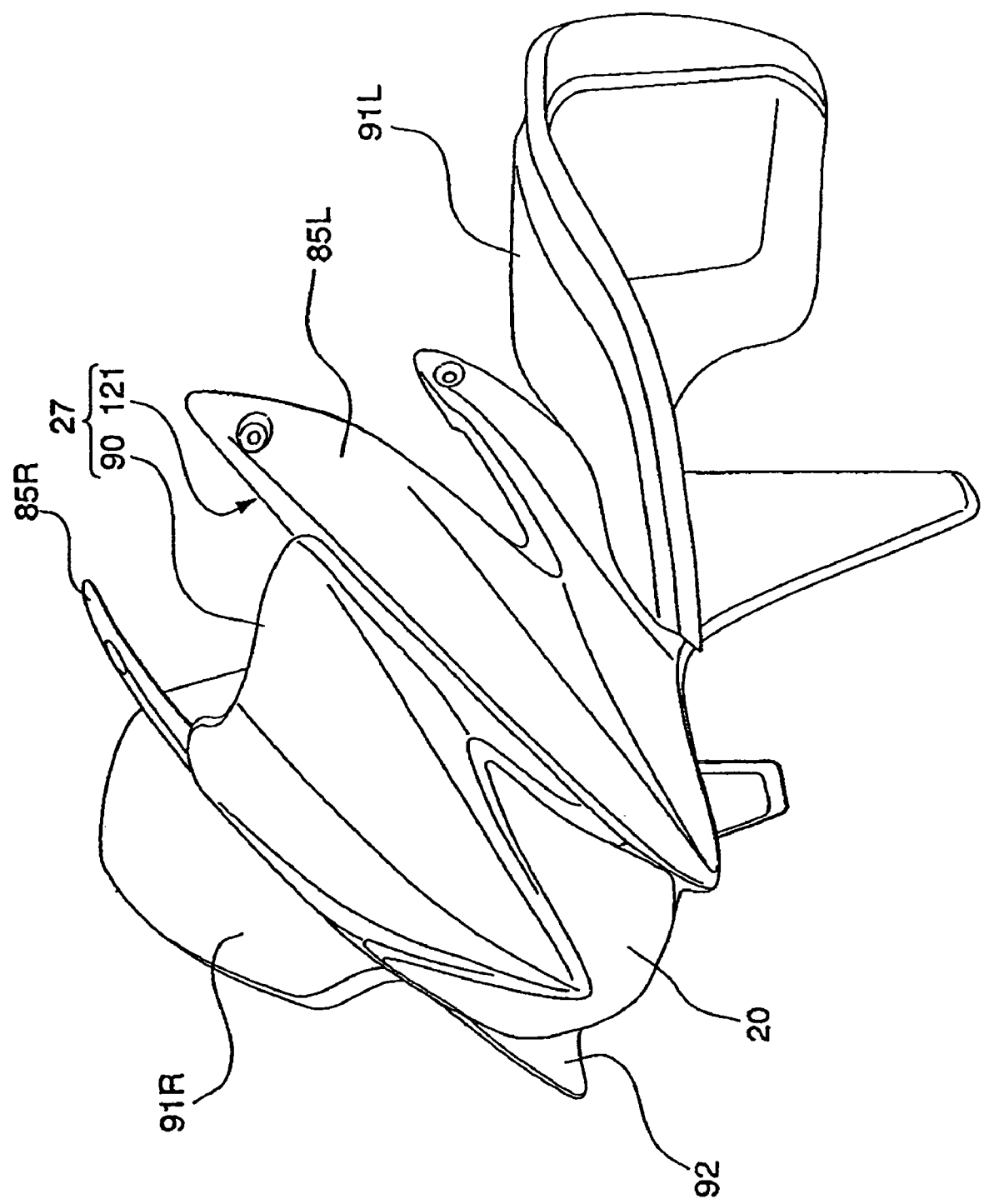
FIG. 4 is a perspective view showing a front cover of the vehicle of FIG. 1, to which one embodiment of the invention is applied.

As shown in FIG. 4, the front cover 27 is provided with a front center cover (a center cover) 90 provided for placement above the front central portion of the body and extended backward, covering the top of the headlight 20. The front cover also includes the left shroud 85L provided for placement on the left side of the front of the body, extended backward, covering the left side of the headlight 20 and opposite to the inside of the body of the left front wheel 14 shown in FIG. 1. The front cover 27 further includes the right shroud 85R provided for placement the right side of the front of the body, extended backward, covering the right side of the headlight 20 and opposite to the inside of the body of the right front wheel (not shown). The front cover 27 also includes a left fender 91L for installation on the left side of the left shroud 85L and covering the top and the back side of the left front wheel 14. The front cover 27 also includes a right fender 91R for installation on the right side of the right shroud 85R and covering the top and the back side of the right front wheel. The front cover also includes a front undercover 92 covering clearance between the headlight 20 and the left shroud 85L and between the headlight and the right shroud 85R, covering the lower portion of the headlight 20.

The front center cover 90, the left shroud 85L, the right shroud 85R, the left fender 91L, the right fender 91R and the front undercover 92 are formed as separate individual pieces, each is made of molded plastic resin and they are integrated together to form the front cover 27. The front cover 27 formed by coupling these is symmetrical.

The attachment of the left shroud 85L and the left fender 91L and the attachment of the right shroud 85R and the right fender 91R will now be described, using the left side for an example in FIG. 5 below. The right side has symmetrical structure to that of the left side.

Four installation holes 94a to 94d, arranged substantially in the center of the side of the left shroud 85L, are formed in the shape of a circular arc, the top of which is convex. Similar installation holes 95a to 95d are also formed on the left fender 91L. The left shroud 85L and the left fender 91L are coupled by fitting resin clips 96b, 96c into the intermediate installation holes 94b, 94c, 95b, 95c in a direction of the arrangement out of these from the outside of the body so that the resin clips pierce the left fender 91L and the left shroud 85L and holding the left fender 91L and the left shroud 85L by the resin clips 96b, 96c.

A bolt 97d is fitted into the installation holes 94d, 95d at each rear end of the left shroud 85L and the left fender 91L from the inside of the body so that the bolt pierces the left shroud 85L and the left fender 91L. The bolt 97d jointly fastens the rear end of a mounting bracket 98 outside the body. That is, after the bolt 97d pierces the installation hole 94d of the left shroud 85L and the installation hole 95d of the left fender 91L from the inside of the body, it is screwed into a tapped hole 99d at the rear end of the mounting bracket 98 outside the body, and the left shroud 85L and the left fender 91L are coupled by holding the left fender 91L and the left shroud 85L by the bolt 97d and the mounting bracket 98 as described above.

A bolt 97a is fitted into the installation holes 94a, 95a at each front end of the left shroud 85L and the left fender 91L from the outside of the body so that the bolt pierces the left fender 91L and the left shroud 85L. The bolt 97a jointly fastens the front end of the mounting bracket 98 outside the body and an intermediate part of the mounting bracket 61 inside the body. That is, after the bolt 97a pierces an installation hole 99a of the mounting bracket 98 outside the body, the installation hole 95a of the left fender 91L and the installation hole 94a of the left shroud 85L, it is screwed into a tapped hole 100a in the middle of the mounting bracket 61 inside the body, and the left shroud 85L and the left fender 91L are coupled by holding the mounting bracket 98, the left fender 91L and the left shroud 85L by the bolt 97a and the mounting bracket 61 as described above.

A stay 101 protruded in a downward direction of the left fender 91L is attached to an intermediate part of the mounting bracket 98 outside the body by a bolt 97e. That is, after the bolt 97e is inserted into an installation hole 95e of the stay 101, it is screwed into a tapped hole 99e in the middle of the mounting bracket 98 outside the body, and the left fender 91L is supported by the mounting bracket 98 by holding the stay 101 by the bolt 97e and the mounting bracket 98 as described above.

Before the attachment to the body frame 12 in a main assembling process, the left fender 91L and the mounting bracket 98 are attached to the left shroud 85L beforehand in a sub-assembling process, and the right fender 91R and the mounting bracket 98 are attached to the right shroud 85R, however, in both cases, as the bolt 97a inserted into the installation holes 99a, 94a, 95a at the front end jointly fastens the mounting bracket 61 inside the body to be attached to the body frame 12 beforehand, only the attachment related to the installation holes 99a, 94a, 95a at the front end is performed in the main assembling process (described later).

Figure 6:
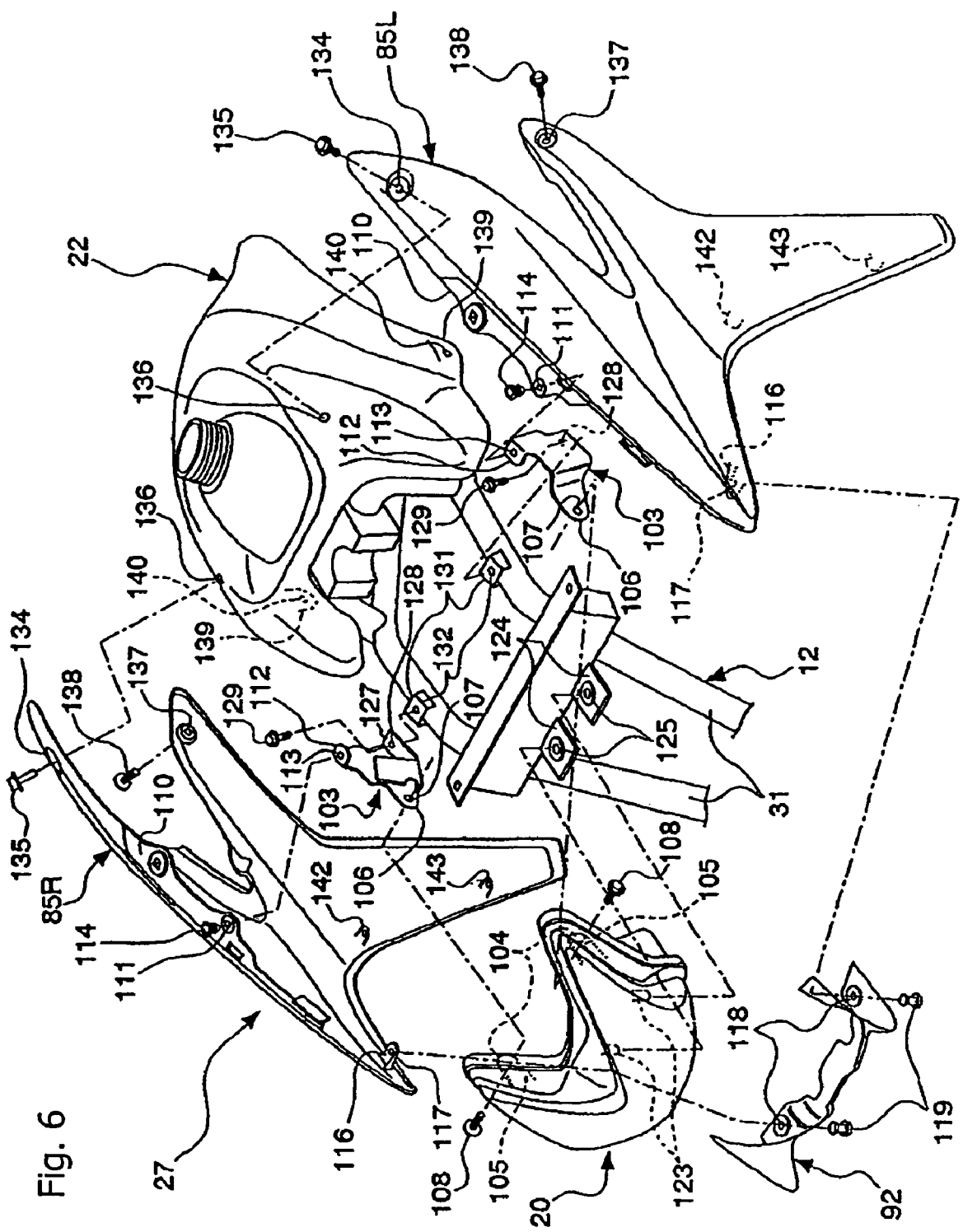
FIG. 6 is an exploded perspective view showing a front fender set of the vehicle of FIG. 1, to which one embodiment of the invention is applied.

The left shroud 85L to which the left fender 91L is attached as described above and the right shroud 85R to which the right fender 91R is attached are attached to the headlight 20 via left and right headlight stays 103 as shown in FIG. 6 in the sub-assembling process before the attachment to the body frame 12 in the main assembling process.

That is, the headlight 20 is provided with a mounting part 104 extended backward from both right and left sides, an installation hole 105 in a lateral direction is formed in these mounting parts 104, and the headlight stay 103 is attached to the mounting part 104 by inserting a bolt 108 into an installation hole 107 of its mounting part 106. That is, as the bolt 108 inserted into the installation hole 105 of the headlight 20 from the outside of the body is screwed into the tapped hole 107 of the mounting part 106 of the headlight stay 103 and the mounting part 104 of the headlight 20 is held by the bolt 108 and the headlight stay 103, the headlight stay 103 is attached to the headlight 20.

A flange 110 extended in the longitudinal direction and protruded inside the body is formed in each intermediate position in the longitudinal direction of the respective upper edge sides of the left shroud 85L and the right shroud 85R, and is attached into an installation hole 113 of a mounting part 112 on the upper side of each headlight stay 103 in an installation hole 111 formed in the flange 110 by a resin clip 114. That is, as the resin clip 114 is fitted into the installation hole 111 of each flange 110 and the installation hole 113 of the mounting part 112 of each headlight stay 103 from the top in the left shroud 85L and the right shroud 85R and holds each flange 110 and each mounting part 112, the left shroud 85L and the right shroud 85R are coupled to each headlight stay 103.

A mounting piece 116 extended inside the body is formed on each front end side of the left shroud 85L and the right shroud 85R, and the front undercover 92 is attached to an installation hole 117 formed in the mounting piece 116. That is, as a resin clip 119 is fitted into an installation hole 118 formed on both right and left sides of the lower surface of the front undercover 92 and the installation hole 117 of each mounting piece 116 of the left shroud 85L and the right shroud 85R from the lower portion and holds the front undercover 92 and each mounting piece 116, the front undercover 92 and the left/right shroud 85L, 85R are coupled.

Figure 7:
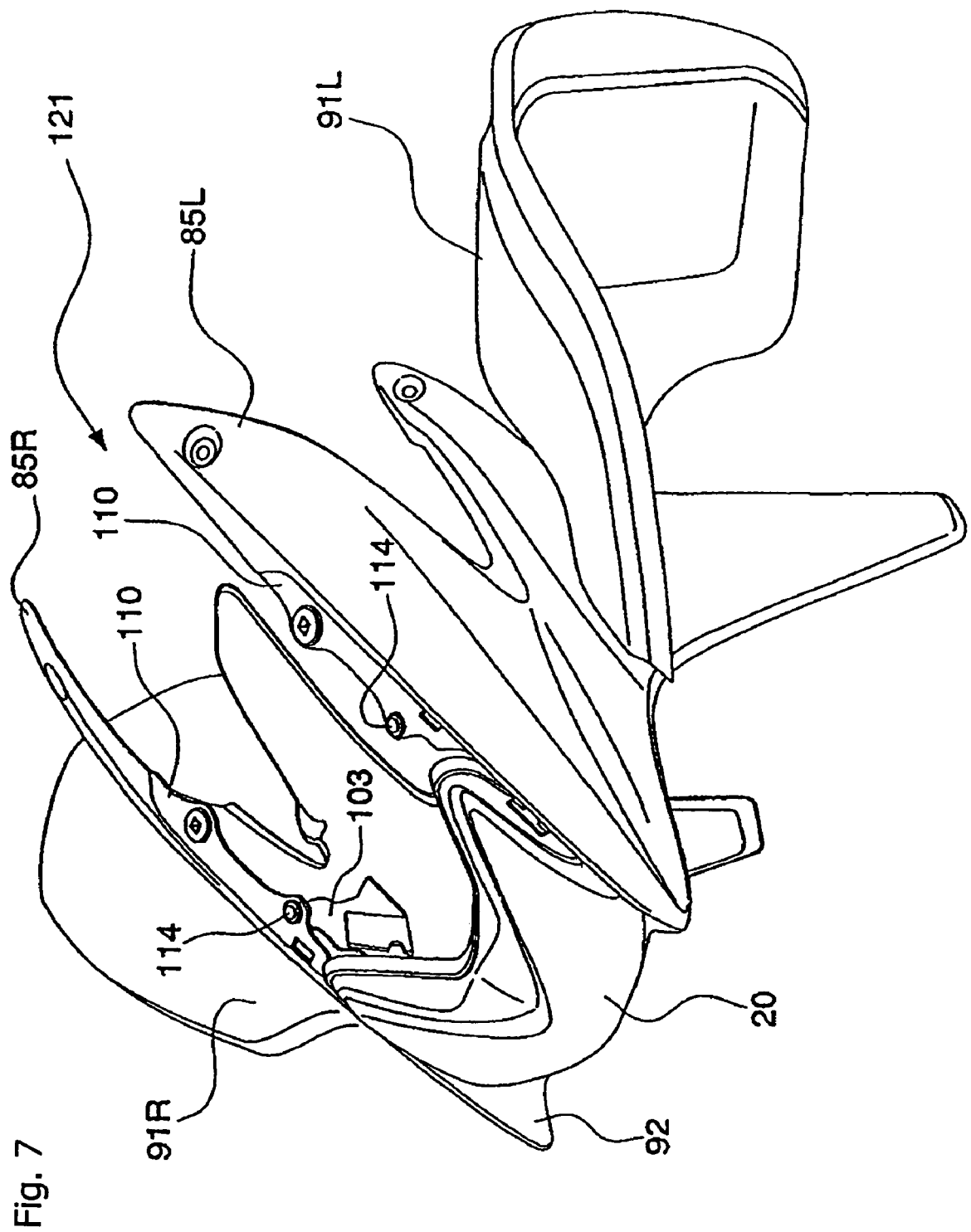
FIG. 7 is a perspective view showing the front fender set of the vehicle of FIG. 1, to which one embodiment of the invention is applied.

As for the front cover 27, in the sub-assembling process, the left shroud 85L and the right shroud 85R are coupled via the headlight 20 in a state in which the left fender 91L is attached to the left shroud 85L and the right fender 91R is attached to the right shroud 85R, further, the front undercover 92 is attached to the left shroud 85L and the right shroud 85R, as shown in FIG. 7, a front fender set 121 (a small assembly) equivalent to the front cover 27 except the front center cover 90 is acquired, and the front fender set 121 is attached to the body frame 12 in the main assembling process.

Figure 8:
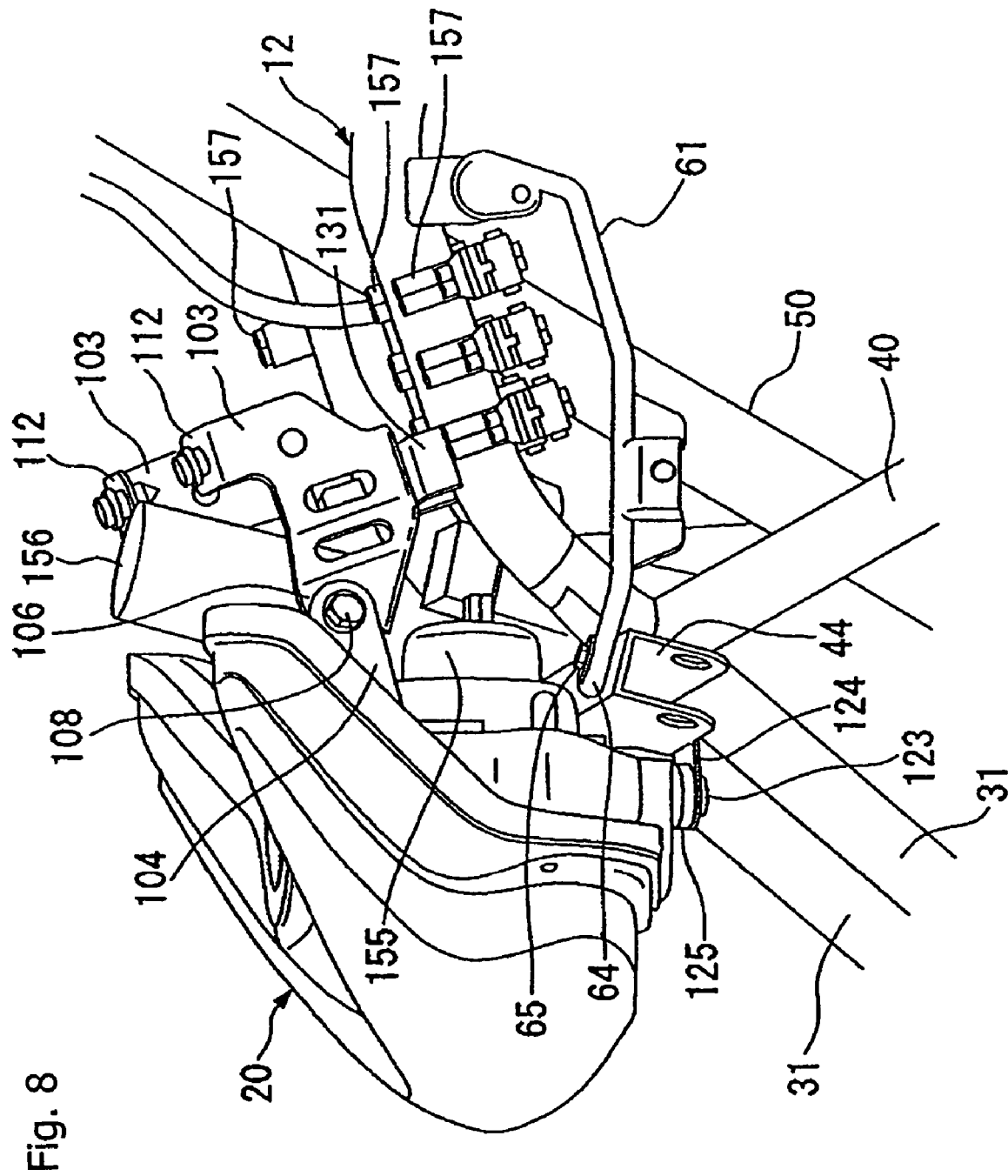
FIG. 8 is a perspective view showing the attachment of a headlight in the front fender set to the body frame of the vehicle of FIG. 1, to which one embodiment of the invention is applied.

That is, in the main assembling process for attaching to the body frame 12, the front fender set 121 covers the body frame 12 from the front and the top. As shown in FIG. 8 (in FIG. 8, only the headlight 20 and the headlight stay 103 in the front fender set 121 are shown in convenience), a mounting shank 123 respectively extended downward from both right and left sides of the headlight 20 is fitted into a circular elastic grommet 125 attached to a mounting part 124 extended forward from the front cushion bracket 44 of the body frame 12 beforehand by pushing the mounting shank from the top. Hereby, a lower part of the headlight 20 is attached to the body frame 12.

In this state, the following first to fifth attachments of the front fender set 121 to the body frame 12 are performed.

Figure 9:
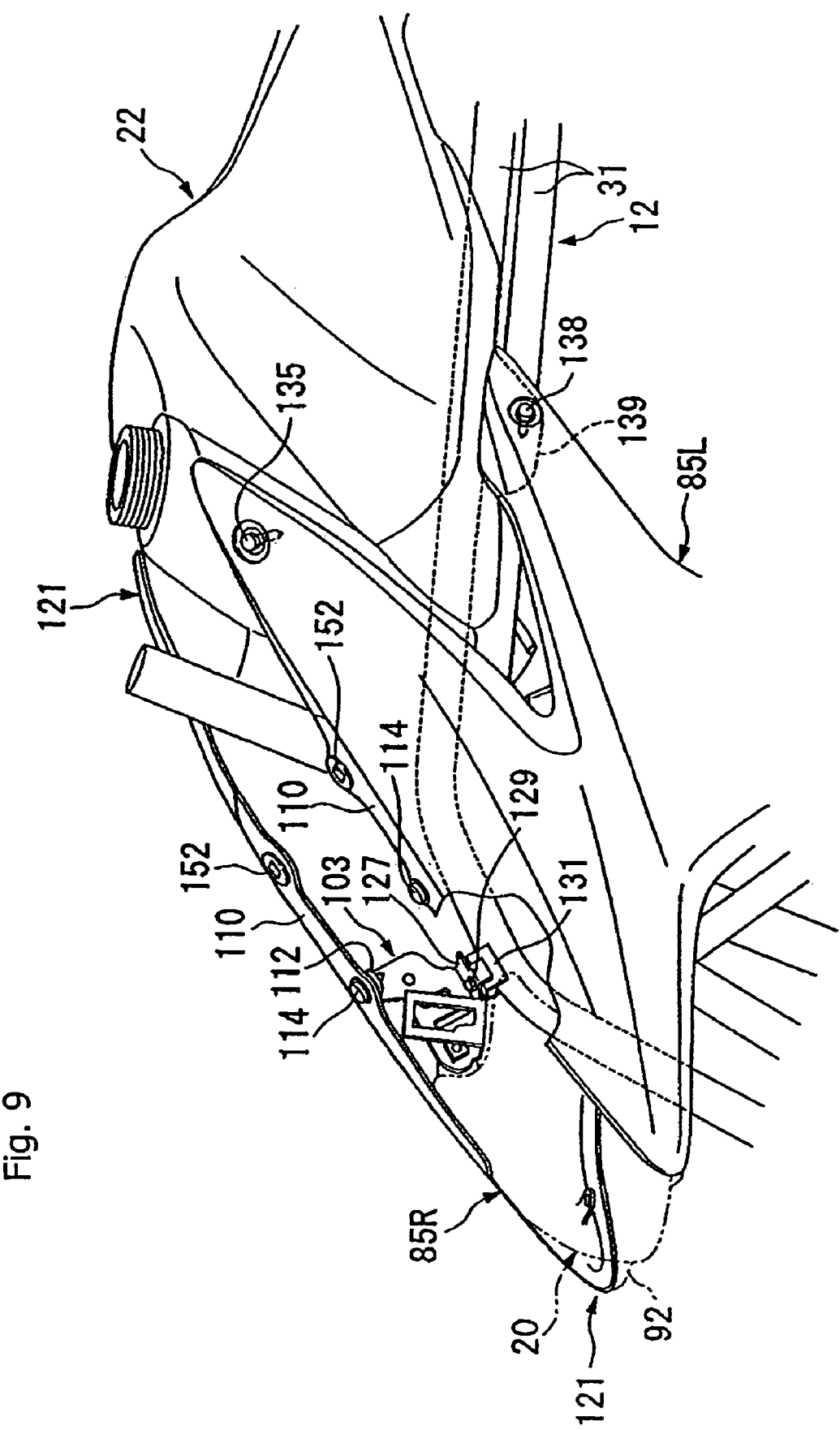
FIG. 9 is a perspective view showing the attachment of the left shroud and the right shroud in the front fender set of the vehicle of FIG. 1, to which one embodiment of the invention is applied to the body frame and a fuel tank.

After a bolt 129 is inserted into an installation hole 128 of a mounting part 127 formed on each lower side of both headlight stays 103 from the top as shown in FIG. 6, the bolt 129 is screwed into each tapped hole 132 of both front fender set brackets 131 in the shape of a pedestal fixed on the right and left upper pipes 31 of the body frame 12, and the mounting part 127 of the headlight stay 103 is held by the bolt 129 and the front fender set bracket 131 (first attachment). Hereby, as shown in FIG. 9, the headlight stay 103 is attached to the body frame 12 and as a result, the rear of the headlight 20 and each flange 110 of the left shroud 85L and the right shroud 85R are attached to the body frame 12. That is, a pair of headlight stays 103 extended backward from both right and left sides of the headlight 20 are attached to the body frame 12, and the left shroud 85L and the right shroud 85R are attached to these headlight stays 103.

After a bolt 135 is inserted into an installation hole 134 shown in FIG. 6 formed on each upper rear end side of the left shroud 85L and the right shroud 85R, the bolt 135 is screwed into each tapped hole 136 on both right and left sides of the front of the fuel tank 22 attached to the body frame 12 in a preceding process (second attachment). Hereby, as shown in FIG. 9, the upper rear end sides of the left shroud 85L and the right shroud 85R are attached to the body frame 12 via the fuel tank 22.

After a bolt 138 is inserted into an installation hole 137 shown in FIG. 6 and formed at the rear end of an intermediate part in a vertical direction of the left shroud 85L and the right shroud 85R, the bolt 138 is screwed into a tapped hole 140 formed in a mounting part 139 in a front lower part of the fuel tank 22 (third attachment). Hereby, as shown in FIG. 9, the rear end sides of the intermediate parts of the left shroud 85L and the right shroud 85R are attached to the body frame 12 via the fuel tank 22.

Figure 5:
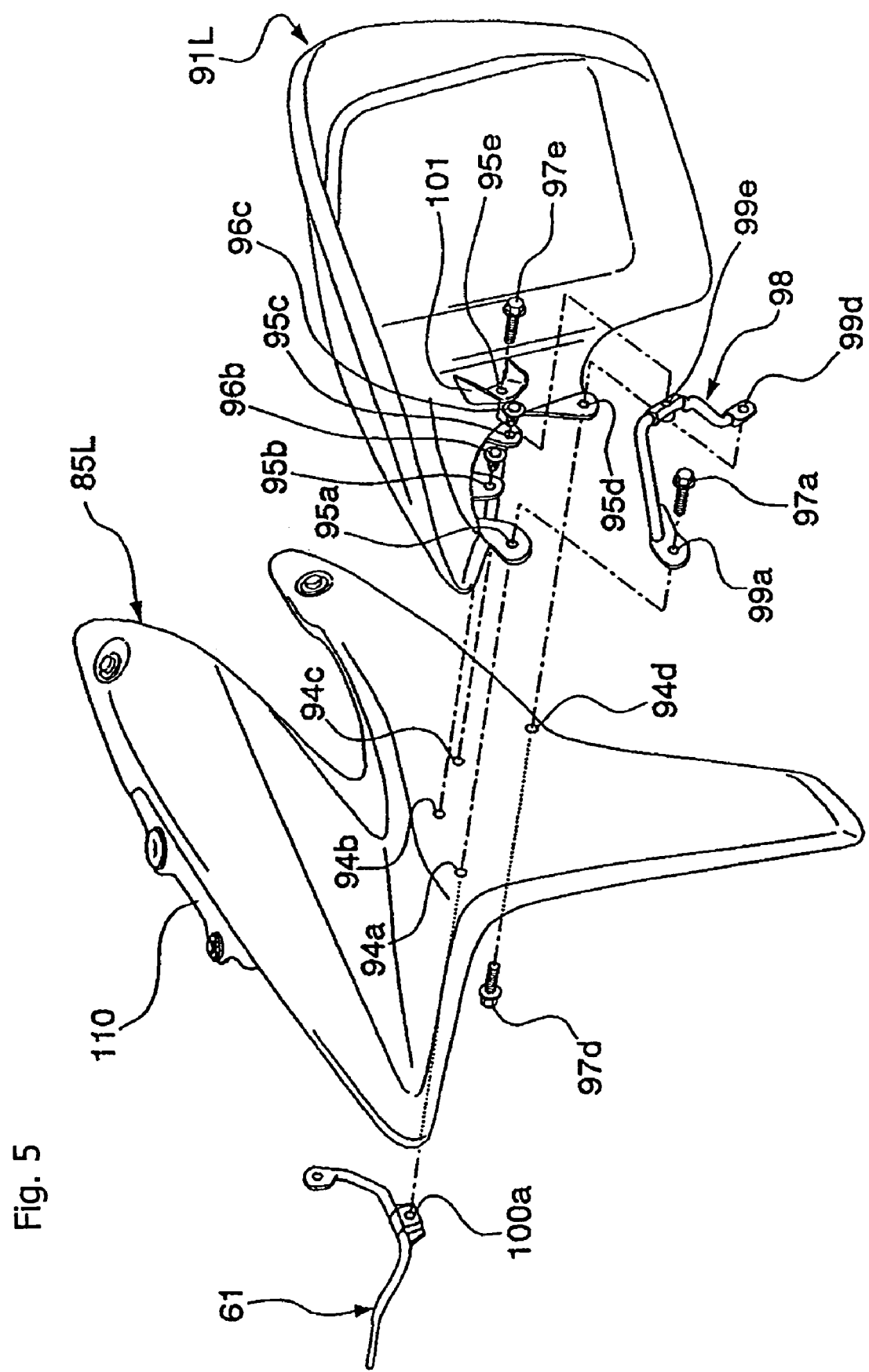
FIG. 5 is an exploded perspective view showing a left shroud and a left fender of the vehicle of FIG. 1, to which one embodiment of the invention is applied.

After the installation hole 99a of the mounting bracket 98 on the left outside, the installation hole 95a of the left fender 91L and the installation hole 94a of the left shroud 85L are pierced by the bolt 97a from the outside of the body of the left shroud 85L as shown in FIG. 5, the bolt is screwed into the tapped hole 100a of the intermediate part of the mounting bracket 61 attached to the body frame 12 beforehand as shown in FIG. 2, and the mounting bracket 98, the left fender 91L and the left shroud 85L are held by the bolt 97a and the mounting bracket 61. Similarly as for the right side, the mounting bracket 98, the right fender 91R and the right shroud 85R are held by the bolt 97a and the mounting bracket 61 (fourth attachment). Hereby, the intermediate parts of the left shroud 85L and the right shroud 85R are attached to the body frame 12 via the mounting bracket 61.

Except the center grille 72 attached to the body frame 12 together with the radiator body 58 in the preceding process beforehand, the left grille 73L and the right grille 73R are attached (fifth attachment). That is, as shown in FIG. 3, both fitting shanks 81 on the lower side of the left grille 73L are fitted into the circular elastic grommet 82 for installation on the side grille mounting part 84 on the lower side of the left brace pipe 40 and the circular elastic grommet 82 for installation on the mounting piece 143 extended inside the body on the lower side shown in FIG. 6 of the lower front edge of the left shroud 85L for example, and both fitting shanks 81 on the upper side of the left grille 73L are fitted into the circular elastic grommet 82 for installation on the side grille mounting part 83 on the upper side of the left brace pipe 40 and the circular elastic grommet 82 for installation on the mounting piece 142 extended inside the body on the upper side shown in FIG. 6 of the lower front edge of the left shroud 85L, deforming the whole left grille 73L.

Similarly as for the right side, both fitting shanks 81 on the lower side of the right grille 73R are fitted into the circular elastic grommet 82 for installation on the side grille mounting part 84 on the lower side of the right brace pipe 40 and the circular elastic grommet 82 for installation on the mounting piece 143 on the lower side of the right shroud 85R, and both fitting shanks 81 on the upper side of the right grille 73R are fitted into the circular elastic grommet 82 for installation on the side grille mounting part 83 on the upper side of the right brace pipe 40 and the circular elastic grommet 82 for installation on the mounting piece 142 of the right shroud 85R, deforming the whole right grille 73R. As described above, the left grille 73L is supported by the left brace pipe 40 of the body frame 12 and the left shroud 85L which is one body cover member, and the right grille 73R is supported by the right brace pipe 40 and the right shroud 85R which is one body cover member.

As described above, the radiator body 58 is supported by the upper pipe 31 and the front pipe 33 of the body frame 12, and the center grille 72 of the radiator grille 71 is supported the brace pipes 40 different from the body frame 12 in all the fitting shanks 75. Hereby, the center grille 72 is arranged so that the fitting shanks 75 which are its all supports are coupled to the radiator body 58 via the body frame 12, in other words, so that external force is always transmitted via the body frame 12 and is supported by the body frame 12.

Additionally, as for the left grille 73L of the radiator grille 71, the fitting shanks 81 on one side are supported by the brace pipe 40, the fitting shanks 81 on the other side are supported the left shroud 85L which is a body cover member, and the left shroud 85L is supported by a position different from the radiator body 58 of the upper pipe 31 of the body frame 12 via the headlight 20 and the fuel tank 22. Hereby, the left grille 73L is arranged so that the fitting shanks 81 which are all the supports are coupled to the radiator body 58 via the body frame 12, in other words, so that external force is always transmitted via the body frame 12, and is supported by the body frame 12 and the left shroud 85L. The right grille 73R symmetrical to the left grille of the radiator grille 71 is also similarly arranged so that the fitting shanks 81 which are all the supports are coupled to the radiator body 58 via the body frame 12, in other words, so that external force is always transmitted via the body frame 12, and is supported by the body frame 12 and the right shroud 85R.

As both headlight stays 103 and both front fender set brackets 131 on the body frame 12 are respectively fastened by the bolts through clearance between the left shroud 85L and the right shroud 85R, the front center cover 90 is not attached until such work is finished.

Figure 10:
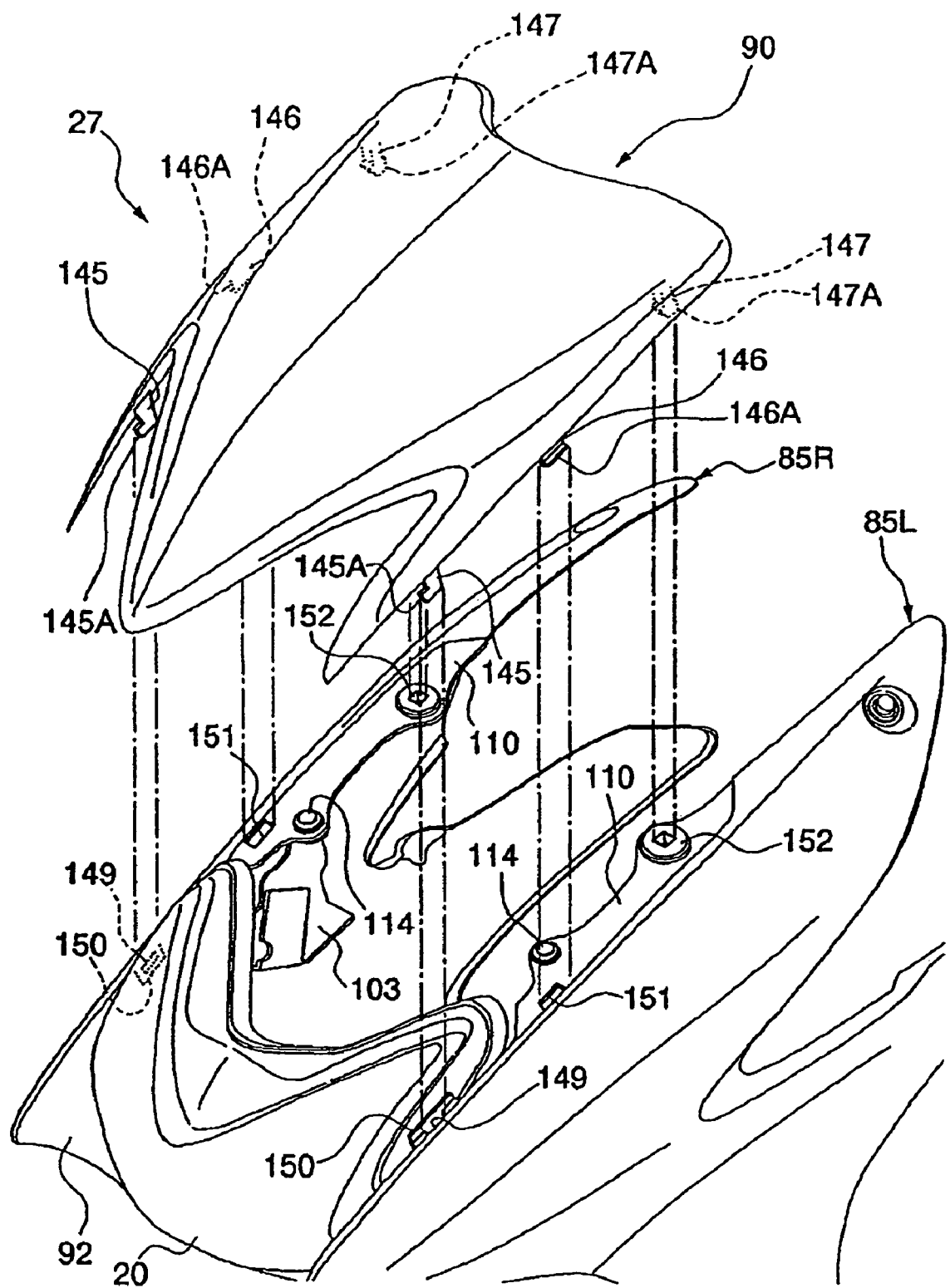
FIG. 10 is an exploded perspective view showing the attachment of a front center cover to the left shroud and the right shroud of the vehicle of FIG. 1, to which one embodiment of the invention is applied.

As shown in FIG. 10, a fitting claw 145 in such a shape extended forward after extended downward, a fitting piece 146 in such a shape protruded sideway after extended downward and a fitting protrusion 147 in such a shape extended downward and thickened toward the end are integrated with the front center cover 90 at both edges in the lateral direction in order from the front.

In the meantime, in the left shroud 85L and the right shroud 85R, a fitting part 150 having a fitting groove 149 vertically pierced in a front position on the upper edge side and long in the longitudinal direction is respectively formed with the fitting part protruded inside the body, a fitting groove 151 vertically pierced in the front position and long in the longitudinal direction is respectively formed in the flange 110, and a circular elastic grommet 152 is respectively attached to the rear side.

In a state in which the front center cover 90 is slightly diagonally inclined so that the end is located on the lower side, the front fitting claw 145 is inserted into the fitting groove 149 of the fitting part 150, is displaced forward, afterward, the rear of the front of the front center cover 90 is lowered downward, and the fitting piece 146 is fitted into the fitting groove 151 of the flange 110, fitting the fitting protrusion 147 into the elastic grommet 152 of the flange 110. Then, the upward movement of a claw part 145A extended forward of the fitting claw 145 is regulated by the fitting part 150, the upward movement of a claw part 146A protruded sideway of the fitting piece 146 is regulated by the flange 110, and the upward movement of a thickened part 147A at the end of the fitting protrusion 147 is regulated by the elastic grommet 152. Hereby, the front center cover 90 is attached to the left shroud 85L and the right shroud 85R.

In the meantime, when the rear of the front center cover 90 is pulled up by predetermined force or larger force from a state attached as described above, the fitting protrusion 147 and the fitting piece 146 are extracted from the elastic grommet 152 and the fitting groove 151, elastically deforming the elastic grommet 152 and the fitting piece 146, and the rear of the front center cover 90 is unfastened from the left shroud 85L and the right shroud 85R. The fitting claw 145 is extracted from the fitting groove 149 of the fitting part 150 by pulling the front center cover 90 diagonally backward, and the whole front center cover 90 is unfastened from the left shroud 85L and the right shroud 85R. As described above, the front center cover 90 is provided so that it can be attached or detached without a tool.

Figure 11:
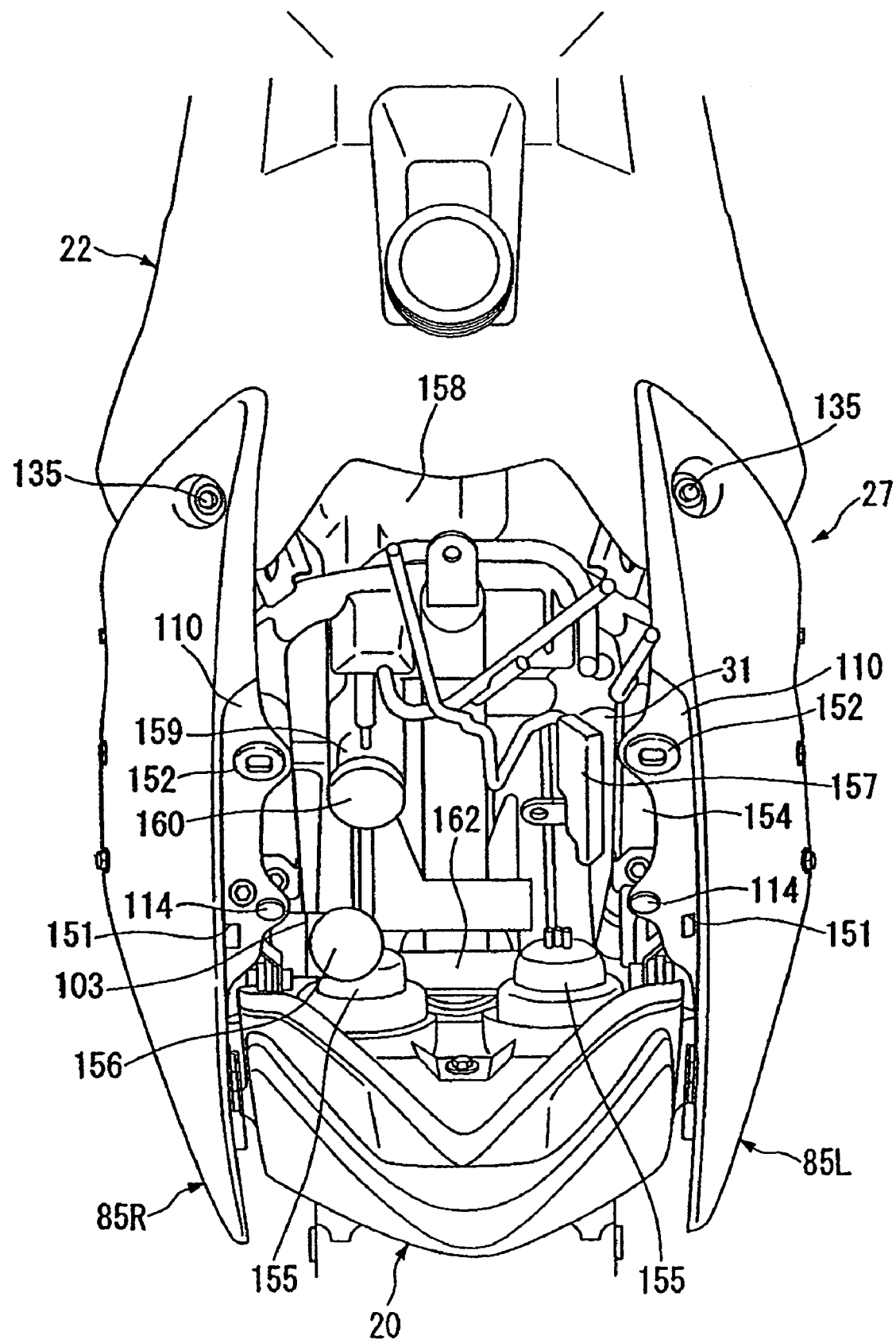
FIG. 11 is a top plan view showing the front portion of the vehicle of FIG. 1, with the front center cover removed for purposes of illustration.

The front cover 27 attached to the front of the body frame 12 as described above is composed of the front center cover 90 for installation on an upper part of the center of the front of the body, surrounding the headlight 20 arranged in the center of the front of the body, the left shroud 85L which is for installation on the left side of the front of the body and on the further left side of which the left fender 91L is provided, the right shroud 85R which is for installation on the right side of the front of the body and on the further right side of which the right fender 91R is provided and the front undercover 92 covering a lower part of the headlight 20. As the front undercover 92 is not extended in the rear of the headlight 20 in the longitudinal direction and the left shroud 85L and the right shroud 85R are arranged with them mutually apart in the lateral direction, space 154 shown in FIG. 11 open below the body is formed under the front center cover 90 without being closed by the body cover member.

Maintenance subject parts which are maintained by detaching the front center cover 90 are collectively arranged in the space 154 open downward under the front center cover 90. That is, the rear of the headlight 20 is opposite to the space 154 and a bulb socket (a maintenance subject part) 155 holding a lighting bulb (not shown) is provided on the rear side so that the bulb socket can be detached. In an example shown in FIG. 11, two lighting bulbs, that is, two bulb sockets 155 are provided on the right and the left.

A capacitor (a maintenance subject part) 156 which is electrical equipment is attached to the right headlight stay 103 provided in the space 154 so that the capacitor can be detached.

In addition, harnessed couplers (maintenance subject parts) 157 are attached to the upper pipe 31 in the space 154 and a separate harness is connected to these couplers 157.

Further, a cooling water tank 158 for the radiator 74 is provided in the space 154 and particularly, a water supply port (a maintenance subject part) 159 for supplying cooling water to the cooling water tank 158 is extended forward in the space 154. A cap 160 which can be detached is for installation on the water supply port 159.

In addition, an engine control unit (a maintenance subject part) 162 is arranged on the rear side and on the lower side of the headlight 20 in the space 154 so that the engine control unit can be detached.

The space 154 is made open upward by detaching the front center cover 90, and the bulb socket 155, the capacitor 156, the water supply port 159 of the radiator 74, the couplers 157 and the engine control unit 162 in order from the top are maintained in the space 154. For example, in replacing lighting bulbs, a hand or hands is/are inserted into the space 154 from the top, the bulb socket 155 is detached and is extracted upward from the space 154, after lighting bulbs are replaced outside the space 154, the bulb socket 155 is inserted into the space 154 from the top and is attached in a predetermined installation location of the headlight 20. Additionally, in replacing capacitors 156, a hand or hands is/are inserted into the space 154 from the top, the capacitor 156 is detached, is extracted from the space 154 upward, a new capacitor 156 is inserted into the space 154 from the top and is attached in an installation location of the right headlight stay 103. Further, in supplying water to the radiator 74, a hand or hands is/are inserted into the space 154, after the cap 160 is detached, a water supply hose is inserted into the space 154 from the top and water is poured into the water supply port 159, the water supply hose is extracted from the space 154 upward and the cap 160 is tightened. In addition, in replacing engine control units 162, a hand or hands is/are inserted into the space 154 from the top, the engine control unit 162 is detached, is extracted from the space 154 upward, a new engine control unit 162 is inserted into the space 154 from the top and is attached in its installation location.

According to this embodiment described above, as the front cover 27 is divided into the front center cover 90 provided on the top of the center of the front of the body, the left shroud 85L provided on the left side of the front body and the right shroud 85R provided on the right side of the front body, only the damaged part out of the front center cover 90, the left shroud 85L and the right shroud 85R has only to be replaced and the cost of replacement in damage can be reduced. Additionally, with the described arrangement, as a metal mold and a molding machine for injection molding required in manufacture can be reduced, the manufacturing cost can be reduced. Further, with the described arrangement, as the limit related to manufacture of design appearance is mostly removed, a degree of the freedom of the design appearance can be enhanced. In addition, with the described arrangement, as each molded part is reduced in size, molding shrinkage and other manufacturing problems are reduced and the precision of molding is easily secured.

In addition, as the separate left fender 91L is attached to the left shroud 85L and the separate right fender 91R is attached to the right shroud 85R, the front cover 27 is divided into the front center cover 90, the left shroud 85L, the right shroud 85R, the left fender 91L and the right fender 91R, and as a result, such each effect as the reduction of the replacement cost in damage, the reduction of the manufacturing cost, the enhancement of a degree of the freedom of design appearance and the enhancement of the precision of molding is further enhanced.

Additionally, as the left shroud 85L and the right shroud 85R are coupled via the headlight 20, the left shroud 85L and the right shroud 85R are coupled via the headlight 20 to be a small assembly in subassembly and this small assembly can be attached to the body frame 12 in a main assembly line even if the front cover 27 is divided into the front center cover 90, the left shroud 85L and the right shroud 85R. Naturally, even if the front cover 27 is further detached into the front center cover 90, the left shroud 85L, the right shroud 85R, the left fender 91L and the right fender 91R as described above, the left fender 91L is attached to the left shroud 85L in subassembly, the right fender 91R is attached to the right shroud 85R, the left shroud 85L and the right shroud 85R are coupled via the headlight 20 to be the front fender set 121 and in the main assembly line, the front fender set 121 can be attached to the body frame 12. Therefore, the extension of time required for assembly per one vehicle can be inhibited. Additionally, when the left shroud 85L and the right shroud 85R are coupled via the headlight 20 to be the front fender set 121, the dimensional error of each part can be adjusted so that the dimensional error of each part is absorbed in a portion in which each part is attached. Therefore, as the precision as the front fender set 121 can be enhanced, the front fender set 121 can be smoothly mounted on the body frame 12.

In addition, as the left shroud 85L and the right shroud 85R are attached to each headlight stay 103 for attaching the headlight 20 to the body frame 12, the headlight stay 103 can be shared. Therefore, the number of parts can be reduced.

Further, a the front center cover 90 is provided so that it can be detached without a tool, it can be detached and attached without a tool in maintenance and others. Therefore, the workability of maintenance and others can be enhanced.

In the above-mentioned embodiment, the case that the left shroud and the left fender are integrated after the left shroud 85L partitioning the inside of the left front wheel is formed separately from the left fender 91L and the right shroud and the right fender are integrated after the right shroud 85R partitioning the inside of the right front wheel is formed separately from the right fender 91R is described for an example, however, the left shroud 85L and the left fender 91L may be also integrally formed, and the right shroud 85R and the right fender 91R may be also integrally formed.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having thus, described the invention, what is claimed is:

1. A front cover kit for a saddle-type vehicle having a body frame, said front cover kit configured to enclose a headlight in a front central portion of the body frame, wherein the front cover kit comprises plural separate, individual cover forming portions including:
   a center cover provided for placement over the front central portion of the body frame;
   a left shroud provided for placement on the left side of the front central portion of the body frame; and
   a right shroud provided for placement on the right side of the front central portion of the body frame; wherein
   the left shroud and the right shroud are connected to each other via the headlight to form a subassembly which is separable from the center cover;
   said front cover kit further comprising a pair of stays, wherein a respective stay is adapted for placement extending backward from each of the right and left sides of the headlight; wherein the stays are attachable to the body frame, and wherein the left shroud and the right shroud are attachable to the respective stays.

2. The front cover kit of claim 1, further comprising:
   a separate left fender for attachment to the left shroud; and
   a separate right fender for attachment to the right shroud.

3. The front cover kit of claim 2, wherein:
   the left shroud and the right shroud are coupled via the headlight into a small assembly,
   the left fender is attached to the left shroud as part of the small assembly, and the right fender is attached to the right shroud as another part of the small assembly; and
   wherein the small assembly is mountable as a pre-assembled unit on the body frame.

4. The front cover kit of claim 1, wherein:
   the left shroud and the right shroud are coupled via the headlight into a small assembly, mountable as a pre-assembled unit on the body frame.

5. The front cover kit of claim 1, wherein the center cover is constructed and arranged to be detachable from said body frame without a tool.

6. The front cover kit of claim 1, wherein the kit is adapted to be installed on an all-terrain vehicle.

7. An all-terrain vehicle, having the front cover kit of claim 1 installed thereon.

8. The front cover kit of claim 1, wherein the center cover is attached to each of the headlight, the left shroud, and the right shroud.

* * * * *